United States Patent
Mayfield et al.

(10) Patent No.: US 10,907,372 B1
(45) Date of Patent: Feb. 2, 2021

(54) APPARATUS FOR COVERING A VEHICLE

(71) Applicants: Mark Mayfield, Vale, NC (US); Mardriekus Mayfield, Lincolnton, NC (US)

(72) Inventors: Mark Mayfield, Vale, NC (US); Mardriekus Mayfield, Lincolnton, NC (US)

( * ) Notice: Subject to any disclaimer, the term of this patent is extended or adjusted under 35 U.S.C. 154(b) by 0 days.

(21) Appl. No.: 16/421,638

(22) Filed: May 24, 2019

(51) Int. Cl.
| | | |
|---|---|---|
| *E04H 6/04* | (2006.01) |
| *B60J 11/04* | (2006.01) |
| *E04H 6/02* | (2006.01) |
| *B60P 3/07* | (2006.01) |
| *B60J 7/16* | (2006.01) |
| *E04H 6/00* | (2006.01) |

(52) U.S. Cl.
CPC .............. *E04H 6/04* (2013.01); *B60J 11/04* (2013.01); *B60P 3/07* (2013.01); *E04H 6/02* (2013.01); *B60J 7/1621* (2013.01); *E04H 6/005* (2013.01)

(58) Field of Classification Search
CPC ... E04H 6/02; E04H 6/04; E04H 6/005; B60J 11/04; B60J 7/1621; B60P 3/07
USPC ................................ 52/66, DIG. 12, DIG. 14
See application file for complete search history.

(56) References Cited

U.S. PATENT DOCUMENTS

| | | | | |
|---|---|---|---|---|
| 2,740,997 A | * | 4/1956 | Gipslis ...................... | E04H 6/04 52/66 |
| 2,853,745 A | * | 9/1958 | Gipslis ...................... | E04H 6/04 52/66 |
| 3,009,211 A | * | 11/1961 | Hansen ..................... | A01K 1/02 52/66 |
| 3,180,510 A | * | 4/1965 | Moller ...................... | B60P 3/07 414/476 |
| 3,258,886 A | * | 7/1966 | Button ...................... | E04H 6/04 52/64 |

(Continued)

FOREIGN PATENT DOCUMENTS

| | | | | |
|---|---|---|---|---|
| AT | 293203 B | * | 9/1971 | .............. B60J 11/00 |
| CA | 2299826 A1 | * | 1/2001 | ........... B62D 63/061 |

(Continued)

OTHER PUBLICATIONS 3 page PDF of machine translation AT 293203 B. (Year: 1971).*
3 page PDF of machine translation of DE 3,102,080 A1. (Year: 1982).*

*Primary Examiner* — Robert Canfield
(74) *Attorney, Agent, or Firm* — Sanchelima & Associates, P.A.; Christian Sanchelima; Jesus Sanchelima

(57) ABSTRACT

An apparatus for covering a vehicle is disclosed. The apparatus comprises a frame comprising anchors. The frame comprises a ramp and rails coupled to the ramp. The apparatus further comprises a hard cover provided in the shape of a vehicle. The hard cover comprises at least one latch. The apparatus further comprises a hydraulic system provided at the frame and coupled to the hard cover. The hydraulic system is operated using a motor. The apparatus may be operated with a cable and pulley system as well. In order to cover the vehicle, the vehicle is received at the ramp and the rails are operated to align the vehicle with the frame. Subsequently, the hydraulic system is operated to lower the hard cover to cover the vehicle. Upon lowering the hard cover, the latch is operably coupled to the anchor to lock the hard cover to the frame.

5 Claims, 5 Drawing Sheets

(56) References Cited

U.S. PATENT DOCUMENTS

| | | | | |
|---|---|---|---|---|
| 3,367,073 A * | 2/1968 | Seeger | E04H 6/04 | 52/66 |
| 3,399,686 A * | 9/1968 | Horton | E04H 6/04 | 135/132 |
| 3,700,124 A * | 10/1972 | Lawrence | B60P 1/431 | 414/537 |
| 3,861,092 A * | 1/1975 | Dale | E04H 6/005 | 52/66 |
| 3,945,159 A * | 3/1976 | Girnus, Sr. | E04H 6/005 | 52/66 |
| 4,296,575 A * | 10/1981 | Verable | E04H 6/04 | 52/66 |
| 5,414,966 A * | 5/1995 | Montoya | E04H 6/04 | 135/116 |
| 5,890,525 A | 4/1999 | Shores | | |
| 6,151,839 A * | 11/2000 | Millward | E04H 6/005 | 52/66 |
| 6,439,644 B1 | 8/2002 | Jester | | |
| 2006/0170239 A1 * | 8/2006 | Altman | B60J 7/1614 | 296/100.02 |
| 2006/0196125 A1 * | 9/2006 | Kea, Jr. | E04H 6/005 | 52/66 |
| 2010/0086386 A1 * | 4/2010 | Freeman | B60P 1/433 | 414/477 |
| 2015/0252559 A1 * | 9/2015 | Vieira Lopes | F24S 40/85 | 52/1 |
| 2016/0168843 A1 * | 6/2016 | Bell | B60P 3/122 | 280/79.2 |

FOREIGN PATENT DOCUMENTS

| | | | | |
|---|---|---|---|---|
| DE | 3102080 A1 * | 8/1982 | | E04H 6/04 |
| DE | 3132539 A1 * | 3/1983 | | E04H 6/02 |
| EP | 0741070 A1 * | 11/1996 | | B60J 5/065 |
| FR | 269357 A1 * | 3/1994 | | B60J 11/00 |
| WO | WO-2015013753 A1 * | 2/2015 | | B60P 3/07 |
| WO | WO-2018104555 A1 * | 6/2018 | | E04H 6/04 |

* cited by examiner

APPARATUS FOR COVERING A VEHICLE

BACKGROUND OF THE INVENTION

Field of the Invention

The present disclosure relates to protective covers for motor vehicles. More specifically, the present disclosure relates an apparatus comprising a cover made up of hard material to cover motor vehicles.

Description of the Related Art

Typically, motor vehicles are stored or parked in garages to protect the motor vehicle from damage while not in use. The motor vehicles may include but not limited to a car, a semi-truck, a bus and so on. However, in many situations, an enclosure such as a garage may not be available to park the motor vehicle. In absence of the enclosure, the motor vehicles are left unattended where they are subjected to extreme environmental and weather conditions. For instance, a car parked outside for several days may be subjected to moisture from rain, dew, snow or frost. Further, the car may be subjected to UV radiation and high temperatures from sunlight, low temperatures from conditions at night or abrasion from flying objects caused to wind and so on. The extreme environmental and weather conditions discussed above may cause severe damage to the car.

In order to protect the motor vehicles from extreme environmental and weather conditions, generally, a cover or a protective cover is provided. The cover may be made up of canvas or nylon. Typically, the cover is provided with a means for securing the cover to the motor vehicle such as an elastic band extending about its periphery or hooks for attaching to the motor vehicle. Further, the cover is provided as a large sheet to cover windshield, roof, rear window, side windows, and side mirrors of the motor vehicle.

Several attempts have been made in the past to provide protective covers for motor vehicles. For example, a United States granted U.S. Pat. No. 7,699,380 discloses a protection device for a vehicle. The protection device is used for protecting a vehicle from damage due to hail storms. The protection device includes a layer of high tensile strength polymer and a metallic layer disposed adjacent to the high tensile strength polymer layer.

Another example is disclosed in a United States granted U.S. Pat. No. 5,890,525. In U.S. Pat. No. 5,890,525, an inflatable car cover that protects the exterior finish of a car from the elements, such as damage caused by rain, sun and leaves, as well as protection from falling debris, such as acorns, hail, branches and stones is disclosed.

Yet another example is disclosed in a United States granted U.S. Pat. No. 6,439,644. In U.S. Pat. No. 6,439,644, a device for a cover on a vehicle, for protecting the vehicle from falling hail during a hail storm is disclosed. The cover comprises an air blower for constantly supplying air to the cover along with spring-loaded outlet air valves whereby a preset pressure is maintained in the cover.

Although the covers provided in the existing art adequately protect the vehicle from severe weather conditions, they have few problems. For example, a user of the vehicle has to manually spread the cover over the vehicle and couple the cover to the vehicle using clips or other connecting means to keep the cover in place. The above process takes considerable time and effort by the user. Further, if any of the clips used to couple the cover to the vehicle break down, then the cover may fly off exposing the vehicle to extreme environmental and weather conditions.

Other documents describing the closest subject matter provide for a number of more or less complicated features that fail to solve the problem in an efficient and economical way. None of these patents suggest the novel features of the present invention. Specifically, none of the disclosures in the art disclose an apparatus comprising a cover made up of a hard material capable of withstanding extreme environmental and weather conditions and that can be operated with minimum manual effort.

Therefore, there is a need in the art for an apparatus comprising a cover made up of a hard material that can withstand extreme environmental and weather conditions and can be operated with minimum manual effort.

SUMMARY OF THE INVENTION

It is one of the objects of the present invention to provide an apparatus comprising a hard cover that can withstand extreme environmental and weather conditions and avoids the drawbacks of the prior art.

It is one object of the present invention to provide an apparatus comprising a hard cover to be operated with the help of a hydraulic system.

It is one object of the present invention to provide an apparatus for covering a vehicle. The apparatus comprises a frame comprising anchors. The frame comprises a ramp and rails coupled to the ramp. The apparatus further comprises a hard cover provided in a shape of the vehicle. The hard cover comprises at least one latch. The apparatus further comprises a hydraulic system provided at the frame and coupled to the hard cover. The hydraulic system is operated using a motor. In order to cover the vehicle, the vehicle is received at the ramp and the rails are operated to align the vehicle with the frame. Subsequently, the hydraulic system is operated to lower the hard cover to cover the vehicle. Upon lowering the hard cover, the latch is operably coupled to the anchor to lock the hard cover to the frame.

It is another object of the present invention to provide an apparatus comprising a ramp to receive a vehicle and to align the vehicle with respect to a hard cover. After aligning, the hard cover is lowered to cover the vehicle.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses an apparatus for covering a vehicle. The apparatus comprises a frame comprising anchors. The frame comprises a ramp and rails coupled to the ramp. The apparatus further comprises a hard cover provided in a shape of the vehicle. The hard cover comprises at least one latch. The apparatus further comprises a hydraulic system provided at the frame and coupled to the hard cover. The hydraulic system is operated using a motor. In order to cover the vehicle, the vehicle is received at the ramp and the rails are operated to align the vehicle with the frame. Subsequently, the hydraulic system is operated to lower the hard cover to cover the vehicle. Upon lowering the hard cover, the latch is operably coupled to the anchor to lock the hard cover to the frame.

Various features and embodiments of an apparatus for covering a vehicle are explained in conjunction with the description of FIGS. 1-10.

Figure 1:
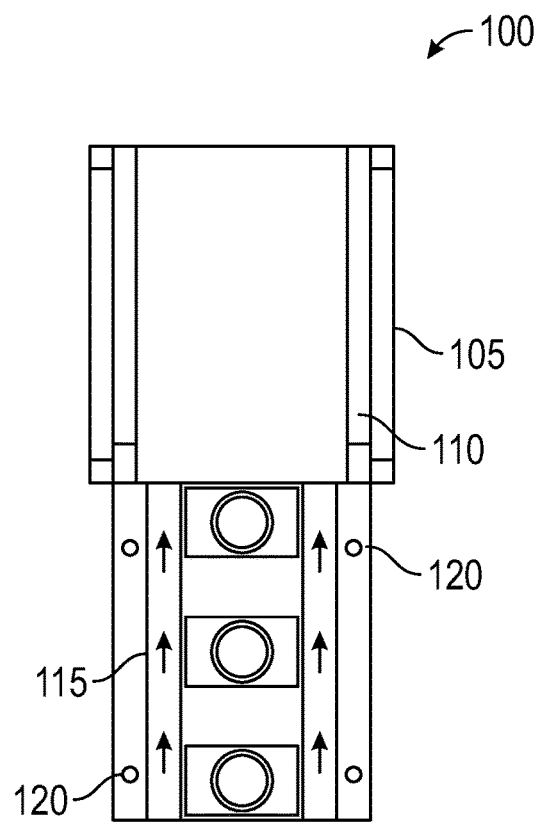
FIG. 1 illustrates a top view of an apparatus 100 for covering a vehicle, in accordance with one embodiment of the present disclosure.

Referring to FIG. 1, a schematic diagram of an apparatus 100 for covering a vehicle is shown, in accordance with one embodiment of the present disclosure. Specifically, FIG. 1 shows an open view of the apparatus 100 comprising a frame 105. The frame 105 may be made up of a metal or suitable material that can withstand weight of a vehicle. In one example, the frame 105 is provided in a U-shape. The frame 105 may comprise guide rails 110 provided at two opposite sides of the frame 105. The guide rails 110 may extend over the length of the frame 105. In one implementation, the frame 105 may further comprises a ramp 115. The ramp 115 may be provided in a flat surface or in a sloping surface. As known, the ramp 115 is used receive the vehicle. In order to receive the vehicle, the vehicle is driven over the ramp 115 such that wheels of the vehicle come on the ramp 115.

In one example, the frame 105 may be provided with a plurality of anchors 120. In another example, the rails 110 may be provided with the plurality of anchors 120, as shown in FIG. 1.

The apparatus 100 further comprises a hard cover 125 provided in a shape of a vehicle. In one example, the hard cover 125 is provided in a shape of a car, semi-truck, bus and so on. The cover 125 is provided in a hollow structure and may be in the shape of the vehicle. It should be understood that the hard cover 125 may be made using materials that are rigid such as plastic, wood, fiber, glass, metal and other suitable material. The hard cover 125 may comprise latches 127 used to couple the hard cover 125 to the frame 105 or the ramp 115.

In order to operate the hard cover 125, a hydraulic system 130 is provided. In one example, the hydraulic system 130 is placed on ground G. In another example, the hydraulic system 130 is coupled to the frame 105. The hydraulic system 130 may comprise a cylinder, which is used to couple the hard cover 125 as shown in FIG. 1. The hydraulic system 130 may comprise a motor 135 used to operate the hydraulic system 130. In one example, the motor 135 may be actuated using a switch or an actuator. The actuator may be provided at the frame 105 or at the hard cover 125 or at any other place. The hard cover 125 may be hingedly mounted at frame 105.

Figure 2:
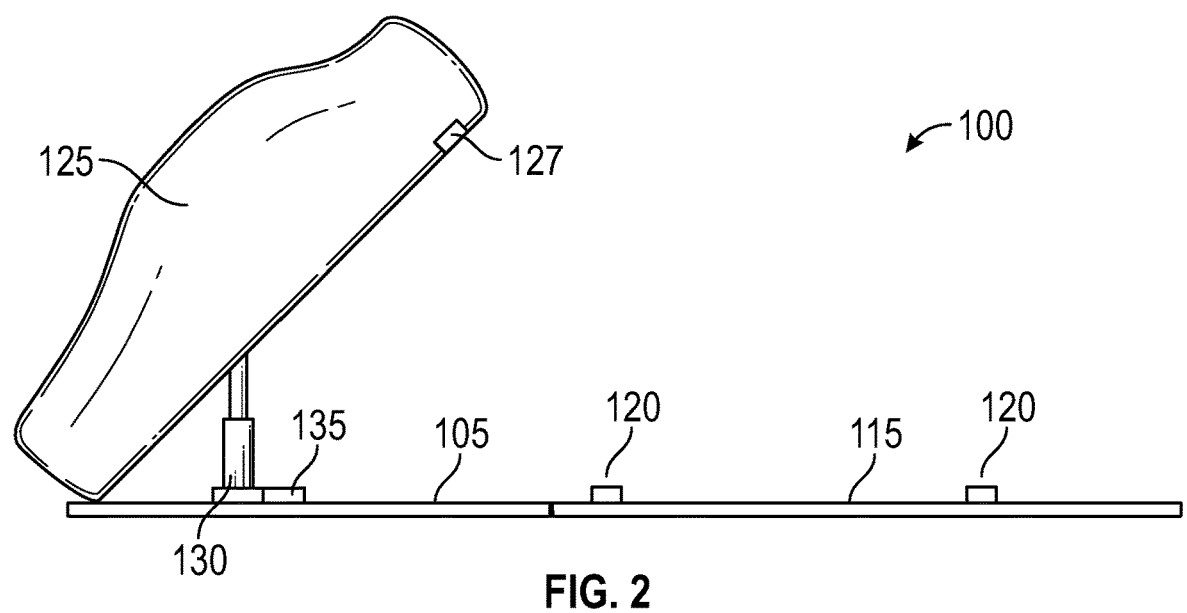
FIG. 2 illustrates a side view of the apparatus 100, in accordance with one embodiment of the present disclosure.

Now referring to FIG. 2, a side view of the apparatus 100 in which the rails 110 and the ramp 115 extended from the frame 105 is shown, in accordance with one embodiment of the present disclosure. The rails 110 may be extended by applying force manually or with the help a second motor.

Figure 3:
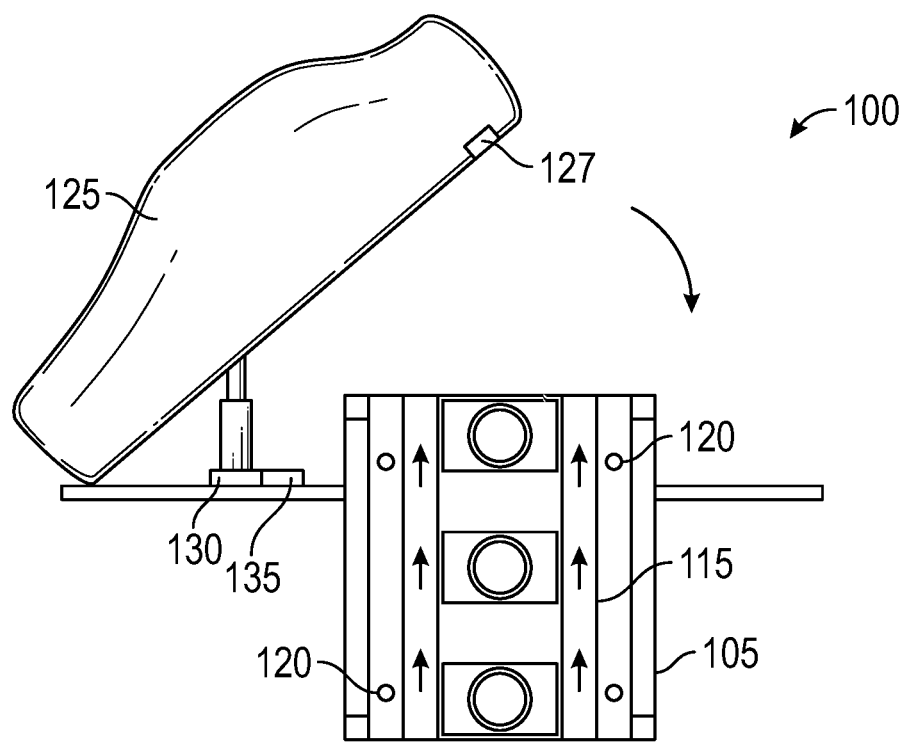
FIG. 3 illustrates a top view of the apparatus 100 in which rails 110 are received in a frame 105, in accordance with one embodiment of the present disclosure.
Figure 4:
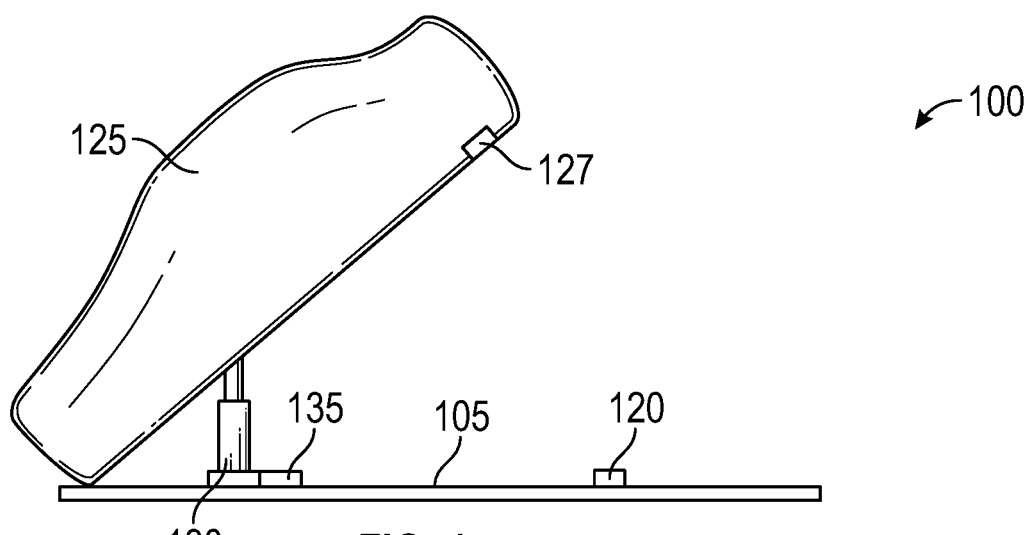
FIG. 4 illustrates a side view of the apparatus 100 shown in FIG. 3, in accordance with one embodiment of the present disclosure.

Referring to FIGS. 3 and 4, an open view and a side view of the apparatus 100 is shown, in which the rails 110 are withdrawn so that the ramp 115 is received within the length of the frame 105. As specified above, the rails 110 may be retrieved within the frame 105 by applying force manually or with the help the second motor.

Figure 5:
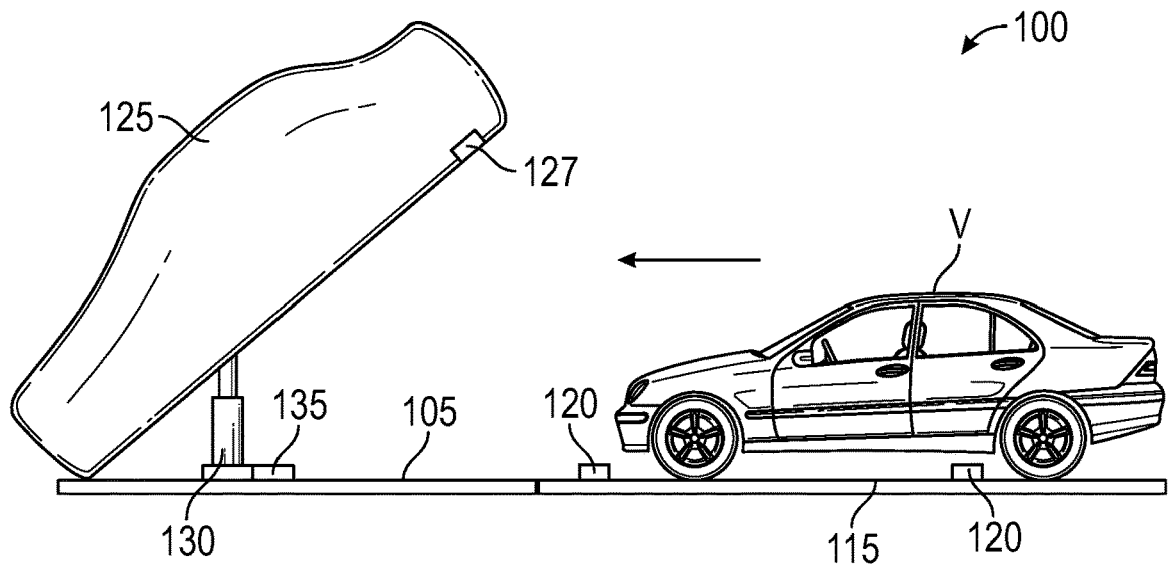
FIG. 5 illustrates a schematic diagram of the apparatus 100 receiving a vehicle V, in accordance with one embodiment of the present disclosure.
Figure 6:
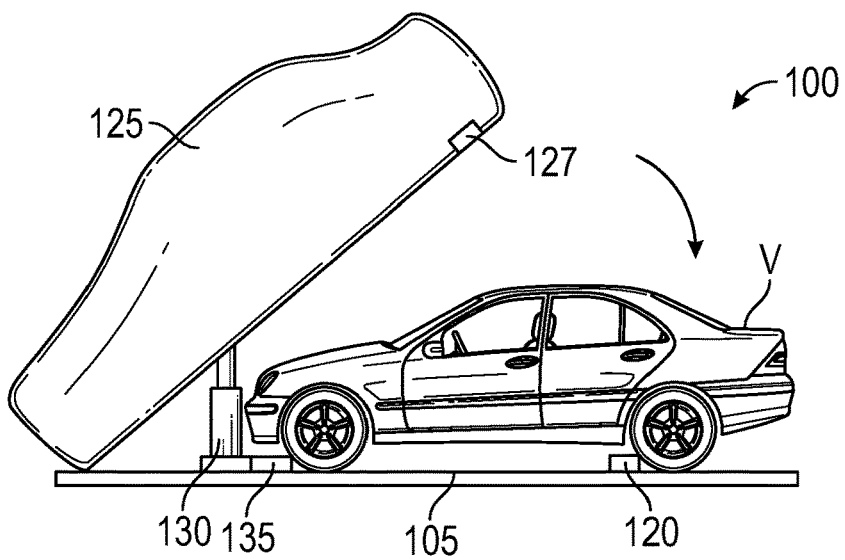
FIG. 6 illustrates a schematic diagram of the vehicle V in alignment with a hard cover 125, in accordance with one embodiment of the present disclosure.
Figure 7:
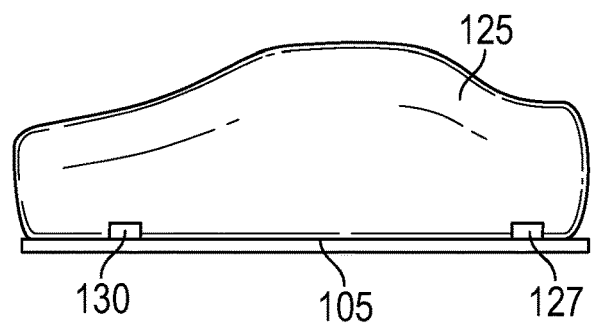
FIG. 7 illustrates the vehicle V covered by the hard cover 125, in accordance with one embodiment of the present disclosure.

Now referring to FIGS. 5 to 7, operation of the apparatus 100 to cover a vehicle V is explained. FIG. 5 shows a side view of the apparatus 100. At first, the rails 110 are extended such that the ramp 115 is extended from the frame 105. After extending, the vehicle V is driven over the ramp 115, as shown in FIG. 5. Subsequently, the second motor is operated to withdraw the rails 110 such that the rails 110 and the ramp 115 come in alignment with the frame 105, as shown in FIG. 6.

After positioning the vehicle V, as shown in FIG. 6, the motor 135 is actuated to operate the hydraulic system 130. Upon operation, the hydraulic system 130 may lift the hard cover 125 over the vehicle V and come down such that the hard cover 125 covers the vehicle V.

Subsequently, the hardcover 125 is locked to the frame 105 by connecting the latches 127 with the anchors 120 provided on the frame 105. After locking the latches 127 with the anchors 120, the vehicle V is covered with the hard cover 125 as shown in FIG. 7. As can be seen, the hard cover 125 covers the vehicle V completely. As such, the vehicle V is protected from dust, extreme environmental and weather conditions.

Further, in order to remove the hardcover 125, at first, the latches 127 are removed from the anchors 120. After removing, the hydraulic system 130 is operated with the help of the motor 135 to lift the hard cover 125 to the position shown in FIG. 6. Subsequently, the second motor may be operated to extend the rails 110 such that the ramp 115 and the vehicle V also extend from the frame 105. Subsequently, the vehicle V is driven away from the ramp 115. After removing the vehicle V, the ramp 115 is withdrawn into the frame 105 (similar to position shown in FIGS. 3 and 4).

When the vehicle V is not there, the hardcover 125 may be closed as shown in FIG. 7. The hard cover 125 is closed so that the dust and other particles are not collected inside the hard cover 125 when exposed to environment in raised position (similar to FIG. 2 or 4).

Figure 8:
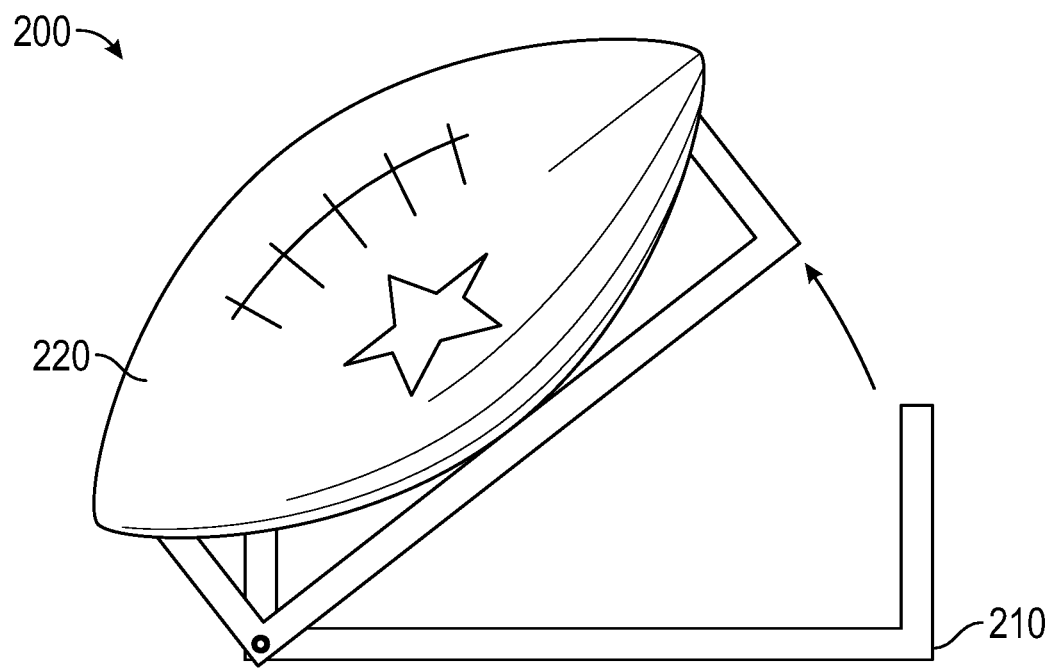
FIG. 8 illustrates an apparatus 200 for covering a vehicle, in accordance with another embodiment of the present disclosure.
Figure 9:
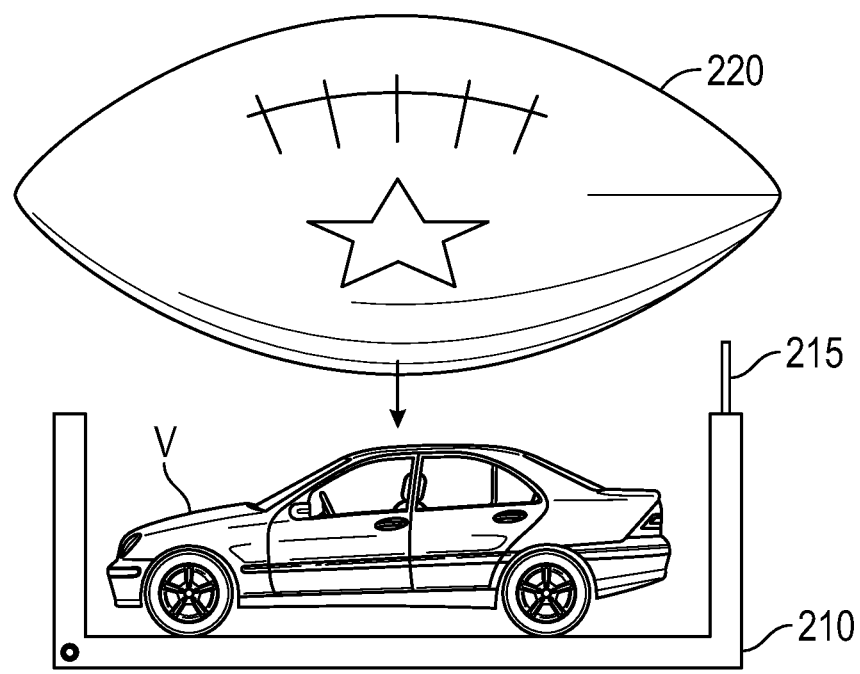
FIG. 9 illustrates the vehicle V in alignment with a cover 220, in accordance with one embodiment of the present disclosure.
Figure 10:
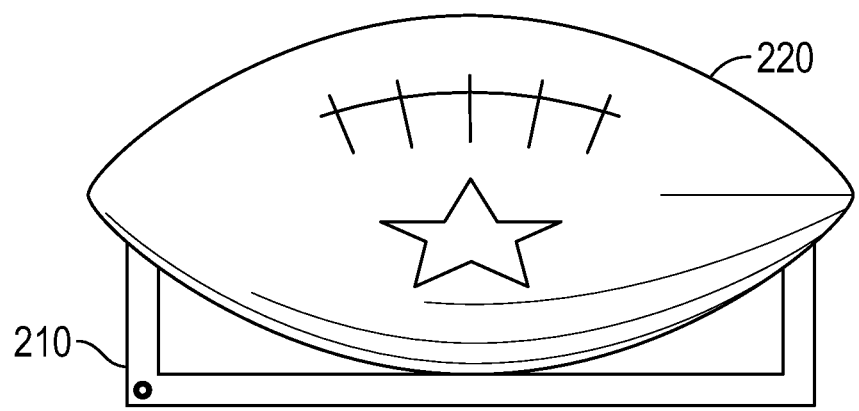
FIG. 10 illustrates the vehicle V covered by the cover 220, in accordance with one embodiment of the present disclosure.

Referring to FIGS. 8 to 10, an apparatus 200 for covering a vehicle V is shown, in accordance with another embodiment of the present disclosure. Referring to FIG. 8, the apparatus 200 comprises a base frame 210. The base frame 210 may be provided with a hydraulic system 215 at one end. The apparatus 200 may comprise a cover 220 provided in a shape of an American football. The cover 220 is coupled to the base frame 210 at another end. It should be understood that the current embodiment is provided to illustrate different designs in which the cover 220 may be provided. It is obvious to a person skilled in the art that the cover may be provided in other designs that may be used to enclose the vehicle V.

FIG. 9 illustrates the apparatus 200. As explained above, the vehicle V is received at the base frame 210. The cover 220 is aligned to cover the vehicle V. After receiving the vehicle V, the cover 220 may be lowered to close the cover 220, as shown in FIG. 10.

In one example, the cover 220 may be provided with a cut section either at a side or at a front side or a back side such that the user may be able to access the vehicle V when the cover 220 is closed on the vehicle V. It is obvious to a person skilled in the art that the cut section is sized to allow access to the user. Further, the cut section may be provided in different shapes.

Although the present disclosure is explained considering that the frame comprises the ramp to receive the vehicle, it should be understood that the apparatus might also be provided without the rails and the ramp. In such implementation, the apparatus comprises the frame having the anchors. The vehicle is driven in alignment with the frame. Subsequently, the hard cover is operated using the hydraulic system to lower the hard cover. After lowering, the hard cover is coupled to the frame by coupling the latches and the anchors to cover the vehicle with the hard cover.

Further, other coupling mechanisms may also be used to couple the hard cover to the frame. For example, a cable or rope may be used to tie the hard cover to the frame. In another example, the hard cover may be provided with clamps to lock the hard cover with the frame.

It is evident from the above disclosure that the apparatus can be used to protect or cover the vehicle with the help of a hard cover. The hard cover may be operated with a cable and pulley lift mechanism in an embodiment. The hard cover can be operated with minimum manual effort i.e., with the help of the hydraulic system and the motor. Further, after parking or placing the vehicle on the ramp, the user may walk up to the actuator and operate the ramp and the hard cover to cover the hard cover over the vehicle. As such, the apparatus of the current disclosure overcomes the problems of the prior art i.e., the user need not have to spread the cover to protect the vehicle. Further, the user need not have to remove and fold the cover when he wishes to use the vehicle.

As the hard cover is made up of hard or rigid material, the hard cover withstands extreme environmental and weather conditions and protects the vehicle.

The apparatus may be placed at residential houses, or apartment buildings or at large public places. In one example, the apparatus may be used in absence of garages at homes.

It should be understood that the hard cover may be provided in various sizes and shapes based on the shape and the size of the vehicle. As such, the vehicle such as car, bus, a semi-truck and other vehicles may be covered using the hard cover described above. Accordingly, the size of the hydraulic system and frame may be selected to operate the hard cover.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for covering a vehicle, the apparatus comprising:
    a frame including anchors, said anchors being on a top surface of said frame and extending outwardly and away from said frame, said frame being entirely horizonal and flat;
    a hard cover including a latch, said latch being at a rear end of said hard cover; and
    a hydraulic system mounted atop of said frame and coupled to the hard cover, said hydraulic system being constantly perpendicular to said frame, said hydraulic system being entirely underneath of said hard cover at a front end of said hard cover, said hard cover being at an acute angle, with respect to said frame, when raised, wherein the frame receives a vehicle and the hydraulic system is operated to lower the hard cover and to cover the vehicle, and wherein the latch is operably coupled to one of the anchors to lock the hard cover to the frame.

2. The apparatus of claim 1, wherein the frame includes a ramp to lead the vehicle onto said frame, said ramp being adjacent to said frame.

3. The apparatus of claim 1, wherein the hydraulic system is operated using a motor, said motor being adjacent to said hydraulic system and being atop of said frame.

4. The apparatus of claim 1, wherein said ramp extends a partial width of said frame.

5. The apparatus of claim 1, wherein said frame is U shaped, with upright lateral sides, said hydraulic system being mounted atop of said upright lateral sides, said hydraulic system being above of said vehicle.

* * * * *